United States Patent [19]
Watts

[11] Patent Number: 6,125,878
[45] Date of Patent: Oct. 3, 2000

[54] SEWER INSPECTION CHAMBER WITH BACK-FLOW PREVENTION VALVE AND METHOD AND APPARATUS FOR INSTALLING VALVE IN SEWER INSPECTION CHAMBER

[75] Inventor: Leon B. Watts, Surrey, Canada

[73] Assignee: Le-Ron Plastics Inc., Surrey, Canada

[21] Appl. No.: 09/477,718

[22] Filed: Jan. 5, 2000

Related U.S. Application Data

[62] Division of application No. 09/168,026, Oct. 8, 1998, Pat. No. 6,029,684, which is a division of application No. 08/843,660, Apr. 11, 1997, Pat. No. 5,826,509.

[51] Int. Cl.[7] .................................................. F16K 43/00
[52] U.S. Cl. ...................................... 137/315.41; 137/315
[58] Field of Search ............................... 137/315.41, 315

[56] References Cited

U.S. PATENT DOCUMENTS

| | | |
|---|---|---|
| 353,888 | 12/1886 | Simpkins . |
| 447,387 | 3/1891 | Wade . |
| 474,843 | 5/1892 | Mahan . |
| 611,074 | 9/1898 | Mowe . |
| 649,002 | 5/1900 | Skaife . |
| 791,326 | 5/1905 | Dale . |
| 922,262 | 5/1909 | Clemens, Jr. . |
| 1,743,338 | 1/1930 | Field ........................................ 137/315 |
| 1,869,258 | 7/1932 | Holland . |
| 1,911,708 | 3/1933 | Mueller et al. ............................ 137/76 |
| 1,989,768 | 2/1935 | Nieman ..................................... 137/315 |
| 1,997,878 | 4/1935 | Wagner ...................................... 137/76 |
| 2,628,056 | 2/1953 | Fuller . |
| 2,770,532 | 11/1956 | Mason ....................................... 137/315 |
| 3,538,514 | 11/1970 | Schimert et al. . |
| 3,566,500 | 3/1971 | Simon . |
| 3,626,148 | 12/1971 | Woytowich et al. . |
| 3,719,200 | 3/1973 | Draper et al. . |
| 3,797,811 | 3/1974 | Jullien et al. . |
| 3,824,629 | 7/1974 | Shiley . |
| 3,865,129 | 2/1975 | Peterson ................................... 137/315 |
| 4,039,004 | 8/1977 | Luthy . |
| 4,184,504 | 1/1980 | Carmichael et al. .................... 137/315 |
| 4,272,854 | 6/1981 | Bokros . |
| 4,503,897 | 3/1985 | Lazrus ...................................... 137/315 |
| 4,505,295 | 3/1985 | Quin et al. ............................... 137/315 |
| 4,576,193 | 3/1986 | Herve . |
| 4,986,301 | 1/1991 | Ziliani et al. . |
| 5,020,567 | 6/1991 | Proulx ...................................... 137/315 |

*Primary Examiner*—Gregory L. Huson
*Assistant Examiner*—Joanne Y. Kim
*Attorney, Agent, or Firm*—Oyen Wiggs Green & Mutala

[57] ABSTRACT

An inspection chamber for use in sanitary sewer systems has an integral back-flow prevention valve. The valve can be installed through an access pipe with the inspection chamber in place underground. The valve does not interfere with the installation or removal of a plug in the inspection chamber during construction and inspection of the sewer system. The inspection chamber comprises a clip oriented to receive a valve member from the direction of an access port. The valve member comprises a pin connected to a flap member by a narrow bridge member. The flap member has a projecting handle member. An installation tool holds the valve member by the handle member and provides a tab which can be hammered downwardly to snap the pin into the clip thereby securing the valve member in the inspection chamber. An inspection chamber according to the invention avoids the necessity of providing a separate buried back-flow prevention valve.

3 Claims, 9 Drawing Sheets

SEWER INSPECTION CHAMBER WITH BACK-FLOW PREVENTION VALVE AND METHOD AND APPARATUS FOR INSTALLING VALVE IN SEWER INSPECTION CHAMBER

This is a divisional of application Ser. No. 09/168,026, filed Oct. 8. 1998, now U.S. Pat. No. 6,029,684 which is a divisional of application Ser. No. 08/843,660, filed Apr. 11, 1997, now U.S. Pat. No. 5,826,509.

FIELD OF THE INVENTION

This invention relates to inspection chambers for use in sanitary sewers, to an inspection chamber with an integral back-flow prevention valve, and to a tool for installing a back-flow-prevention valve in an installed inspection chamber.

BACKGROUND OF THE INVENTION

Inspection chambers are required to be provided in sanitary sewer systems in many jurisdictions. An inspection chamber is typically installed where the sanitary sewer outlet from a building joins the sewer main of a municipal sewer system. Inspection chambers serve two main purposes. First, during construction of a new sewage system an inspection chamber can be used as a location for a plug to seal the passage between the new sewage system and the sewer main until the new sewage system has been tested and approved. After testing and approval, the plug can be removed by hooking a handle on the plug and pulling the plug out of the inspection chamber. Second, an inspection chamber can be used as a point of access to remove blockages from a sewer system.

An inspection chamber is typically installed at least several feet underground. The inspection chamber typically has interior dimensions slightly larger than the diameter of the sewage outlet pipe in which it is installed. Typical diameters of sewage outlet pipes from residential or light industrial buildings are in the range of 4 inches to 6 inches. A generally vertical access pipe, which is typically somewhat larger in diameter than the sewage outlet pipe, extends from the inspection chamber to the surface where it is sealed with a cap. The access pipe is typically several feet long. Typical diameters of access pipes are in the range of about 6 inches to 10 inches. After an inspection chamber has been installed it is very difficult to gain access to the inside of the inspection chamber.

It is generally desirable to provide a back-flow valve in the sewage outlet pipe. A back-flow valve serves to prevent sewage from backing up from the municipal sewer into a building. The back-flow valve also serves to prevent vermin, such as rats, from entering a building from the municipal sewer lines through the building's sewage outlet pipe. A problem with back-flow valves is that they are installed in the sewage outlet line which is several feet underground. If the back-flow valve malfunctions or if debris gets stuck in the back-flow valve then it is generally necessary to dig down to the back-flow valve to replace or repair it. This is both disruptive and expensive.

The inventors have recognized a need for an inspection chamber which can be plugged, as described above, during testing and approval of a sewage system and has an integral back-flow valve. It has not been previously practical to provide such an inspection chamber because any back-flow valve would interfere with insertion or removal of a plug. After the plug has been removed the inspection chamber is several feet down the access pipe and is not easily accessible.

SUMMARY OF THE INVENTION

This invention provides an inspection chamber with an integrated back-flow prevention valve. One aspect of the invention provides an inspection chamber for a sanitary sewer line. The inspection chamber comprises: a housing having inlet outlet and access ports for connecting inlet, outlet and access pipes and a flapper valve in the housing. The access port is located in an upper portion of the housing and is oriented generally perpendicularly to each of the inlet and outlet ports. The flapper valve comprises: a valve member comprising a transverse pin, a flap member attached to the pin and a handle member projecting from a central location on the flap member; a clip for receiving the pin of the valve member and detachably retaining the pin in pivotal relation to the housing, the clip located below the access port and above the inlet port and oriented to receive the pin from a direction of the access port; and a sealing surface inside the housing around the inlet port. When the pin of the valve member is received in the clip, the flap member bears against the sealing surface and is capable of blocking a flow of sewage from the outlet port through the inspection chamber and out the inlet port and the valve member can pivot about the pin to permit sewage to flow from the inlet port, through the inspection chamber and out the outlet port.

A second aspect of the invention provides a sanitary sewer system comprising: a sewage outlet pipe extending from a building to a municipal sewer and an inspection chamber connected in the sewage outlet pipe at an underground location between the building and the municipal sewer. The inspection chamber comprises: a housing having an inlet port connected to a portion of the sewage outlet pipe extending to the building, an outlet port connected to a portion of the sewage outlet pipe extending to the sewer, an access port connected to an access pipe extending generally vertically to an unburied location, the access port in an upper portion of the housing oriented generally perpendicularly to each of the inlet and outlet ports; and a flapper valve in the housing. The flapper valve comprises: a valve member comprising a transverse pin, a flap member attached to the pin and a handle member projecting from a central location on the flap member; a clip for receiving the pin of the valve member and detachably retaining the pin in pivotal relation to the housing, the clip located below the access port and above the inlet port and oriented to receive the pin from a direction of the access port; and a sealing surface inside the housing around the inlet port. When the pin of the valve member is received in the clip, the flap member bears against the sealing surface and is capable of blocking a flow of sewage from the outlet port through the inspection chamber and out the inlet port and the valve member can pivot about the pin to permit sewage to flow from the inlet port, through the inspection chamber and out the outlet port. A sealing lid is provided at a top end of the access pipe.

The invention also provides a method for installing a flap valve valve member in an inspection chamber in a sanitary sewer system. The method comprises the steps of: providing a valve member comprising a transverse pin, a flap member attached to the pin and a handle member projecting from a central location on the flap member; attaching the valve member to a holder on an installation tool comprising an elongated shaft, the holder comprising means for holding the handle member and a tab adjacent the pin; lowering the valve member through an access port on the inspection chamber with the installation tool; aligning the pin with a clip in the inspection chamber; hammering the installation tool downwardly to cause the tab to press the pin into engagement in the clip; and removing the installation tool.

In a preferred embodiment, the step of attaching the valve member to a holder on an installation tool comprises inserting the handle member between a pair of fingers biased toward each other. Preferably the step of hammering the installation tool downwardly comprises sliding a weight upwardly along the shaft of the installation tool and dropping the weight onto a stop on the shaft. The method may further include the step of removing the valve member from the inspection chamber by the steps of engaging a ring in the handle member with a hook and pulling the hook upwardly after the step of removing the installation tool.

Yet another aspect of the invention provides a tool for use in practising the methods of the invention. The tool can be used to install a flap valve valve member in an inspection chamber in a sanitary sewer system. The tool comprises an elongated shaft extending from to a handle to a holder, a stop on the shaft between the handle and the holder and a weight slidably mounted to the shaft. The holder comprises: first and second generally parallel opposed fingers spaced apart by a distance sufficient to receive a handle member projecting from a flap valve member; bias means for resiliently displacing the first finger toward the second finger for releasably pinching a handle member projecting from a flap valve member between the first and second fingers; and a tab projecting from the holder generally perpendicularly to the shaft at a base of the fingers, between the handle and the stop.

Yet another aspect of the invention provides a sealing lid for an access pipe of an inspection chamber in a sewer system. The sealing lid comprises a circular plastic body, a piece of a ferromagnetic material moulded into the plastic body, a sealing member extending peripherally around the plastic body, and a pair of opposed locking members each comprising a lug member pivotally mounted to the plastic body and a stop member projecting adjacent the lug member. The stop members allow rotation of the lug members between engaged and disengaged positions.

BRIEF DESCRIPTION OF THE DRAWINGS

In drawings which illustrate preferred but non-limiting embodiments of the invention.

DETAILED DESCRIPTION

Figure 1:
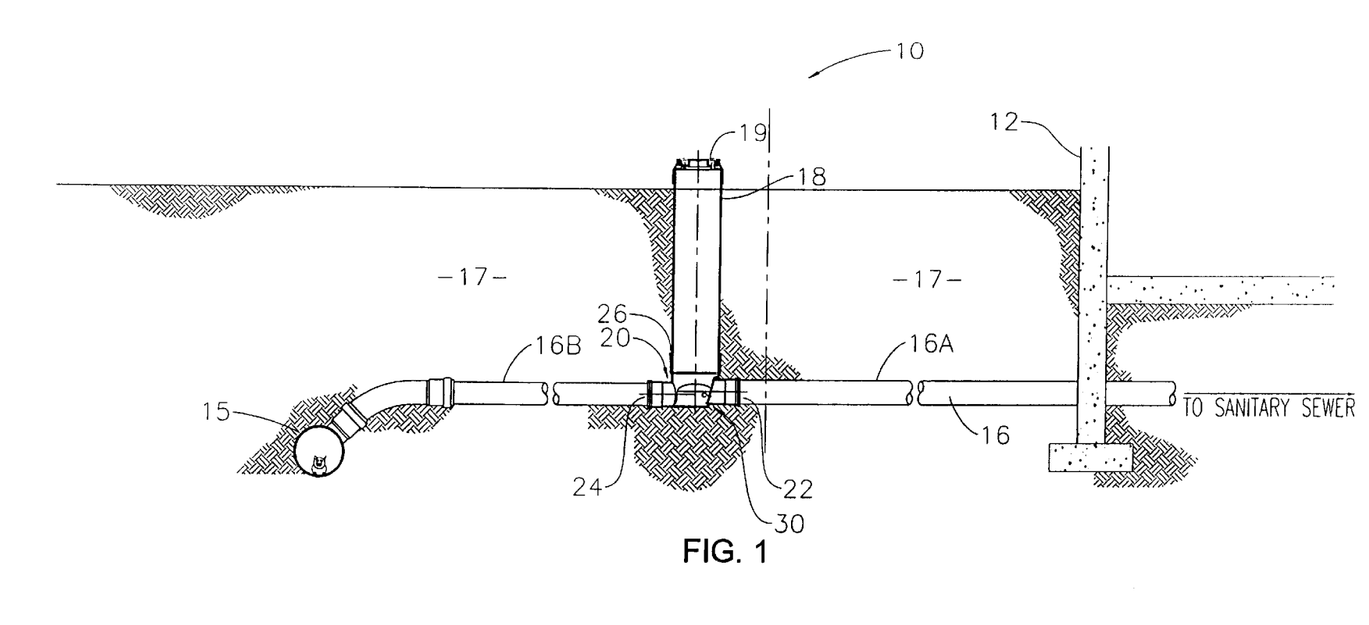
FIG. 1 is a schematic elevational view of an inspection chamber installed in a sewage system according to the invention.

FIG. 1 shows a sewage system 10 according to the invention. Sewage system 10 carries wastewater from a building 12 to a sewer main 15 through a sewage outlet pipe 16. Sewage outlet pipe 16 lies in ground 17 and is inclined slightly toward sewer main 15. An inspection chamber 20 is located in sewage outlet pipe 16 A first portion 16A of sewage outlet pipe 16 extends from building 12 to an inlet port 22 of inspection chamber 20. A second portion 16B of sewage outlet pipe 16 extends from an outlet port 24 of inspection chamber 20 to sewer main 15. An access pipe 18 extends generally vertically from an access port 26 of inspection chamber 20 to the surface of ground 17. The upper end of access pipe 18 is closed by a sealing cap 19.

A back-flow prevention valve 30 is located in inspection chamber 20 adjacent inlet port 22. In use, sewage flows from building 12 through portion 16A of sewage outlet pipe 16, through inspection chamber 20 and to sewer main 15 through portion 16B of sewage outlet pipe 16. Valve 30 prevents vermin from entering building 12 from sewer main 15 and also prevents sewage from backing up from sewer main 15 and flowing into building 12 through portion 16A of sewage outlet pipe 16. Valve 30 comprises a valve member 32 pivotally attached inside inspection chamber 20.

Figure 3A:
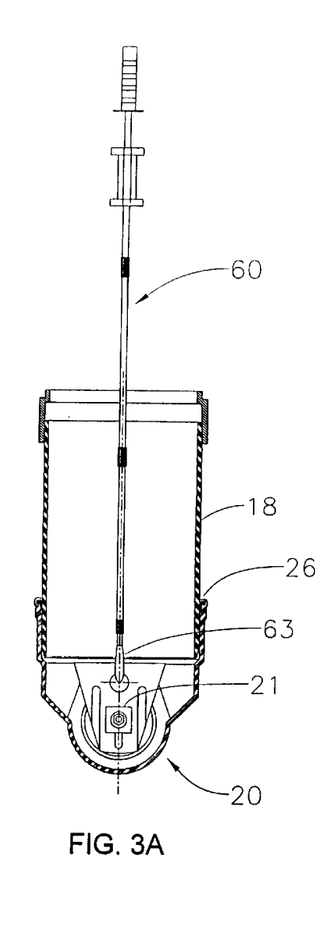
FIGS. 3A through 3H are views illustrating a sequence of steps for installing a valve member according to the invention in the inspection chamber of the sewer system of FIG. 1 with the tool of FIGS. 4A through 4D.

A distinguishing feature of the invention is that valve member 32 and inspection chamber 20 are constructed so that valve member 32 can be inserted into inspection chamber 20 after inspection chamber 20 is in place under ground 17. This permits the use of inspection chamber 20 to receive a plug 21 (FIG. 3) plugging inlet port 22 from inside inspection chamber 20 while building 12 is under construction (as is required by some municipalities). As described below, the methods of the invention also permit valve member 32 to be removed and replaced through access pipe 18. As such, the invention provides significant advantages over the current state of the art which combines a conventional unvalved inspection chamber with a separate buried back-flow prevention valve.

Figures 2A, 2B, 2C:
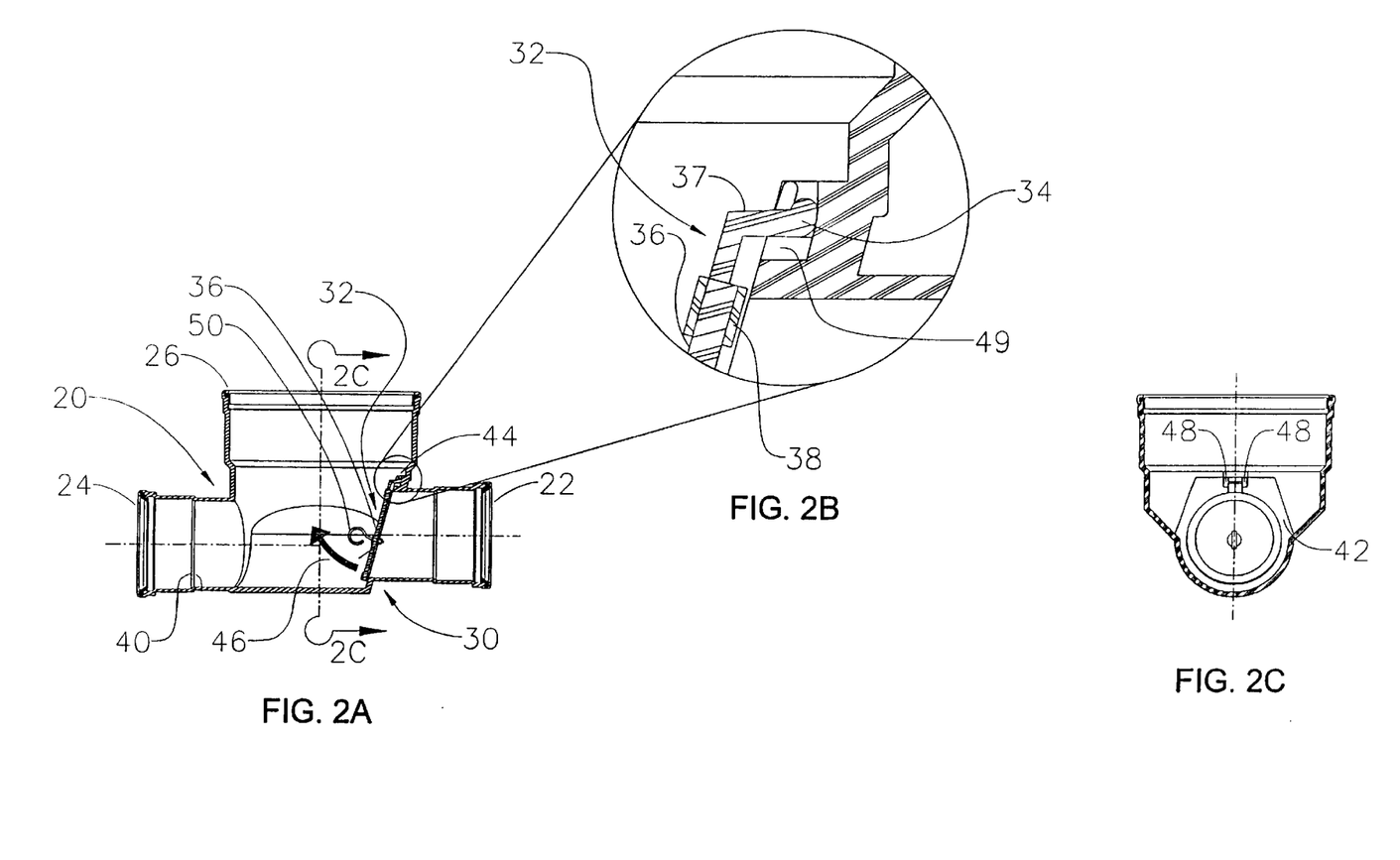
FIG. 2A is a longitudinal section through the inspection chamber of the sewage system of FIG. 1.
FIG. 2B is a detailed view of a portion thereof.
FIG. 2C is a transverse section through the inspection chamber of the sewage system of FIG. 1 looking toward the inlet port thereof.

The construction of inspection chamber 20 is shown in detail in FIG. 2. Inspection chamber 20 comprises a housing 40 formed from any suitable material such as injection moulded ABS plastic. Housing 40 supports suitable seals around ports 22, 24, and 26 for sealing connections to portions 16A and 16B of sewage outlet pipe 16 and access pipe 18. Any suitable seals known to those skilled in the art may be used. Those skilled in the art will realize that the shapes and dimensions of ports 22, 24, and 26 may need to be adapted for the particular type of seals used.

A valve seating surface 42 is provided inside housing 40 around inlet port 22. Valve seating surface 42 is preferably planar. Valve member 32 comprises a transversely mounted pin 34 attached to a flap member 36 by a short bridge member 37. Pin 34 is retained by a clip 44. Clip 44 permits pin 34 to pivot relative to housing 40 as indicated by arrow 46. Normally gravity holds valve member 32 with flap member 36 in contact with valve seating surface 42 so that valve 30 is closed. Wastewater or other sewage arriving at valve 30 pushes flap member in the direction of arrow 46, thereby opening valve 30. A suitable resilient sealing material 38 is provided either on seating surface 42 or on flap member 36. Preferably the sealing material 38 is on flap member 36.

Clip 44 preferably comprises a pair of upwardly projecting resilient fingers 48 which grip either end of pin 34 with bridge member 37 extending between fingers 48. Pin 34 is held in a recess 47 between fingers 48 and adjacent portions of the wall of housing 40. Fingers 48 are preferably moulded integrally with housing 40. Fingers 48 are oriented upwardly so that clip 44 detachably receives pin 34 when it is inserted from the direction of access port 26. A notch 49 is preferably provided between fingers 48 below recess 47. Notch 49 can be used to remove a broken valve member 32 as described below.

A handle member 50 projects from a central portion of flap member 36. Handle member 50 is used in the installation of valve member 32 in housing 40 as described below. In the currently preferred embodiment of the invention, handle member 50 comprises a ring 52 of approximately 1 inch in diameter projecting in a plane which bisects valve member 32. Ring 52 has a central aperture 54.

Figure 3B:
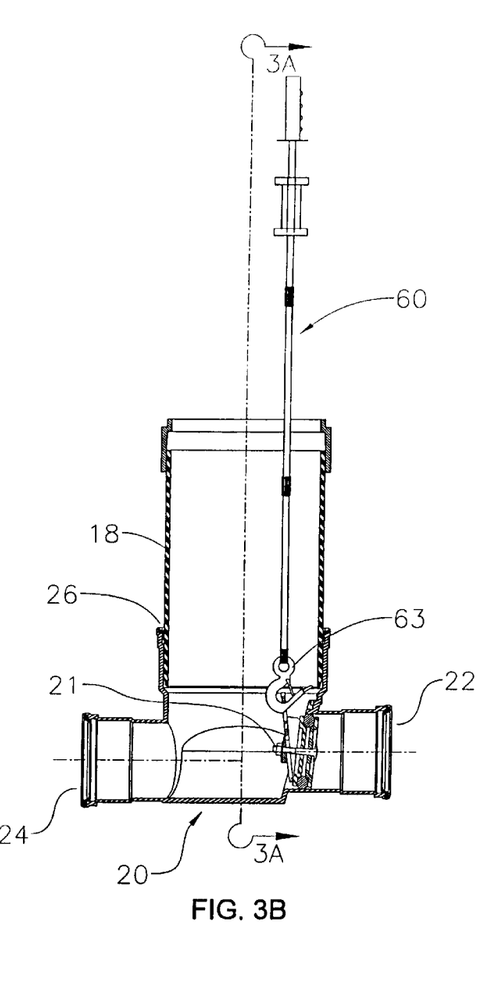
Figure 3C:
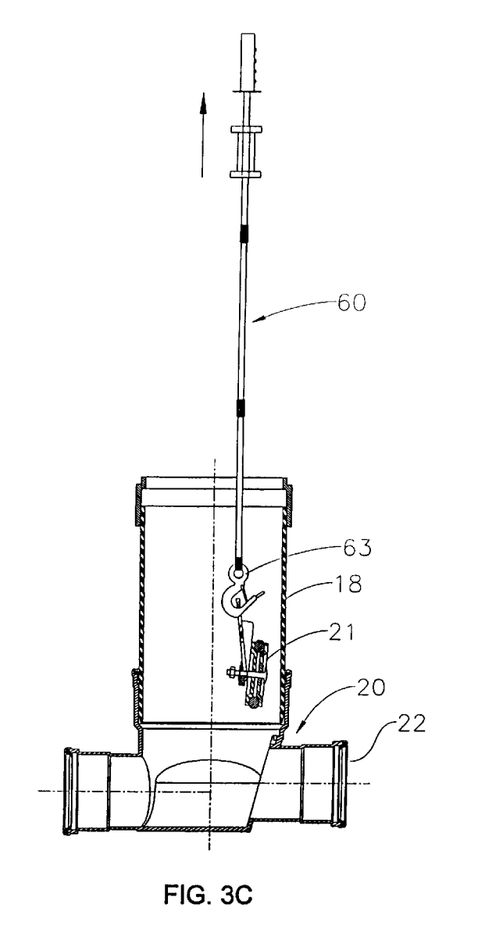

The method for installing valve member 32 in inspection chamber 20 begins with inspection chamber 20 buried in soil 17. Plug 21 plugs inlet port 22 from inside inspection chamber 20 as shown in FIGS. 3A and 3B. Plug 21 is then removed by hooking the ring handle of plug 21 with a hook 63 lowered through access pipe 18, pulling upwardly until plug 21 is released, and removing plug 21 through access pipe 18 as shown in FIG. 3C. Preferably hook 63 comprises a spring-loaded catch so that plug 21 cannot fall off from hook 63 after hook 63 has been fully engaged with the handle of plug 21.

Figure 4A:
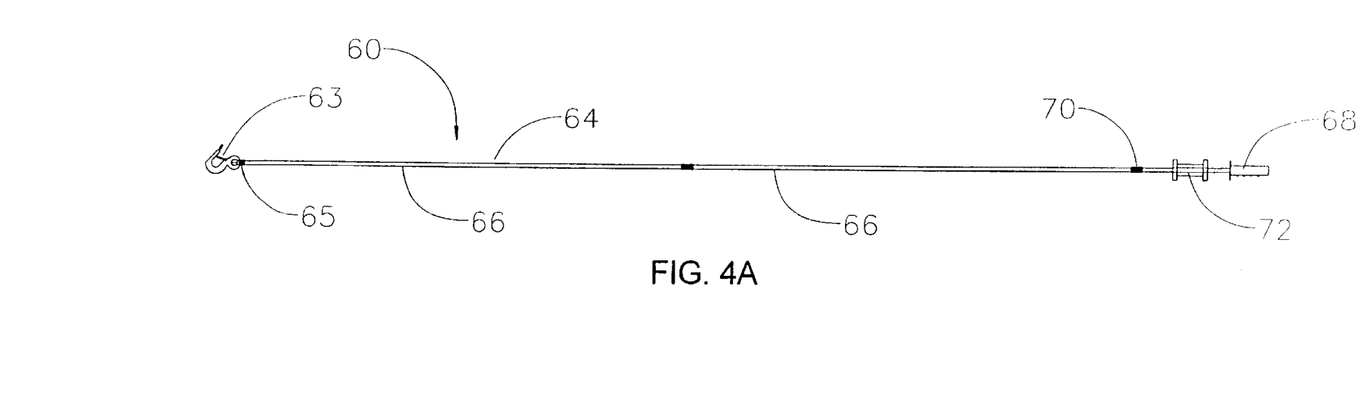
FIG. 4A is an elevational view of a tool for use in the methods of the invention.

Plug 21 may be removed with a tool 60 as shown in FIG. 4A. Tool 60 comprises a hook 63 connected to a handle 68 by a shaft 64 which is long enough to reach down access pipe 18 into inspection chamber 20. Shaft 64 may comprise several sections 66 so that the length of shaft 64 can be adjusted for the depth of inspection chamber 20.

As shown in FIG. 4A, tool 60 preferably has a weight 72 slidably mounted at the upper end of shaft 64 between handle 68 and a stop 70. Weight 72 preferably weighs about 1 kilogram. An upward pull on plug 21 may be achieved by sliding weight 72 upwardly against handle 68 to jolt hook 63 upwardly. In this case, handle 68 acts as a stop. A separate upper stop may be provided below handle 68 and above stop 70.

Figure 4B:
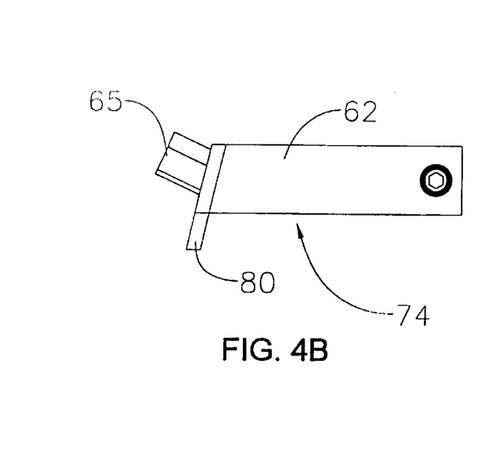
FIGS. 4B, 4C and 4D are respectively side elevational and top plan views of a head for installing valve members in inspection chambers according to the invention for use with the tool of FIG. 4A and a side elevational view of a lateral hook for use in the invention with the tool of FIG. 4A; and, FIGS. 5A, 5B and 5C are respectively a top plan view, a cross sectional view and a bottom plan view of a sealing lid for the access pipe of the sewer system of FIG. 1.

After plug 21 has been removed, hook 63 on tool 60 is replaced with a head 62. Preferably hook 63 and head 62 are each connected to the end of shaft 64 with a connector 65 so that they may be readily interchanged. Connector 65 may be a simple threaded fitting, as shown, which screws onto the end of shaft 64 or may be another suitable type of coupling.

Figure 4C:
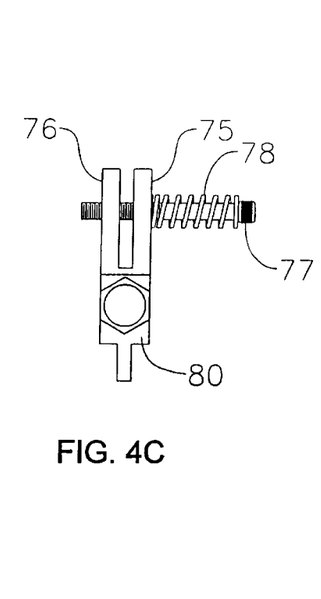

A valve member 32 is then attached the head 62 of tool 60. As shown in FIGS. 4B and 4C, head 62 comprises a holder 74 for holding a valve member 32 by its handle member 50. In the currently preferred embodiment of the invention holder 74 comprises a pair of fingers 75, 76. A bolt 77 extends from first finger 75 through a hole in second finger 76. A compression spring 78 on bolt 77 resiliently compresses fingers 75 and 76 together.

Figure 3D:
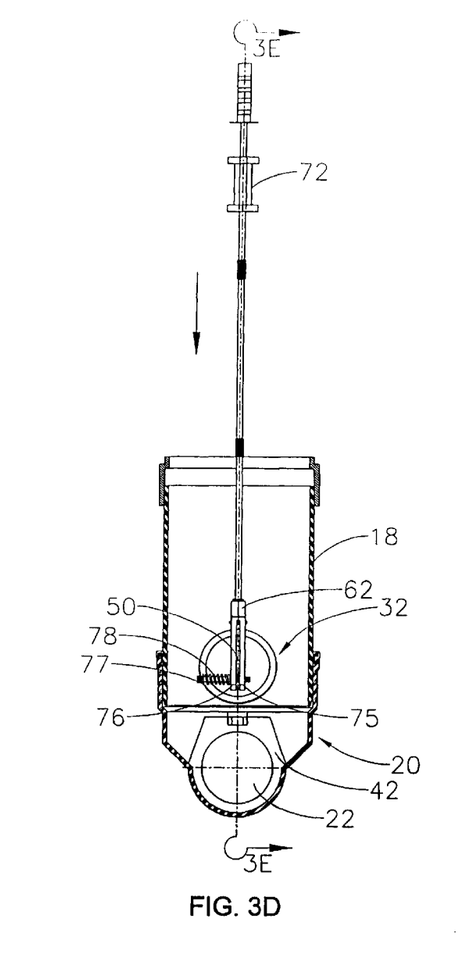
Figure 3E:
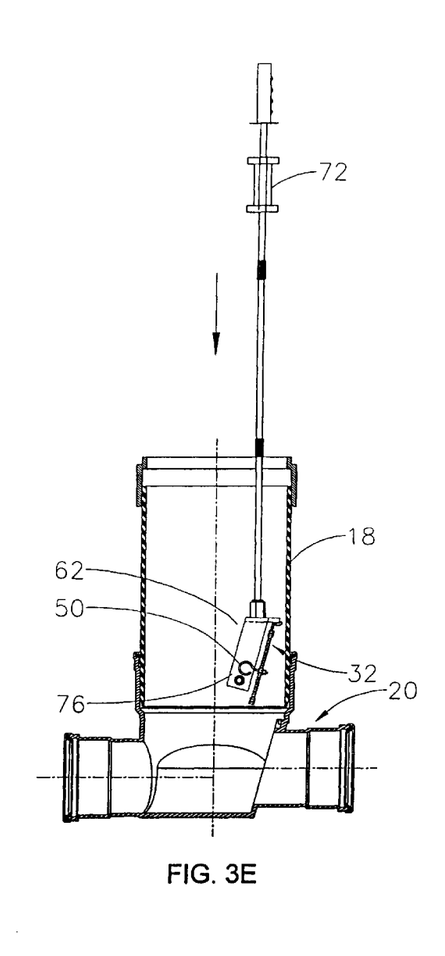

Valve member 32 is attached to head 62 by sliding handle member 50 between fingers 75 and 76 so that it is securely but releasably pinched between fingers 75, 76 as shown in FIGS. 3D and 3E. When valve member 32 is attached to head 62 a tab 80 projecting from head 62 lies just above and adjacent pin 34. Holder 74 does not need to grasp handle member extremely tightly. It is only necessary to hold handle member 50 tightly enough to reliably lower valve member 32 through access pipe 18 and align it in inspection chamber 20 as described below.

Figure 3F:
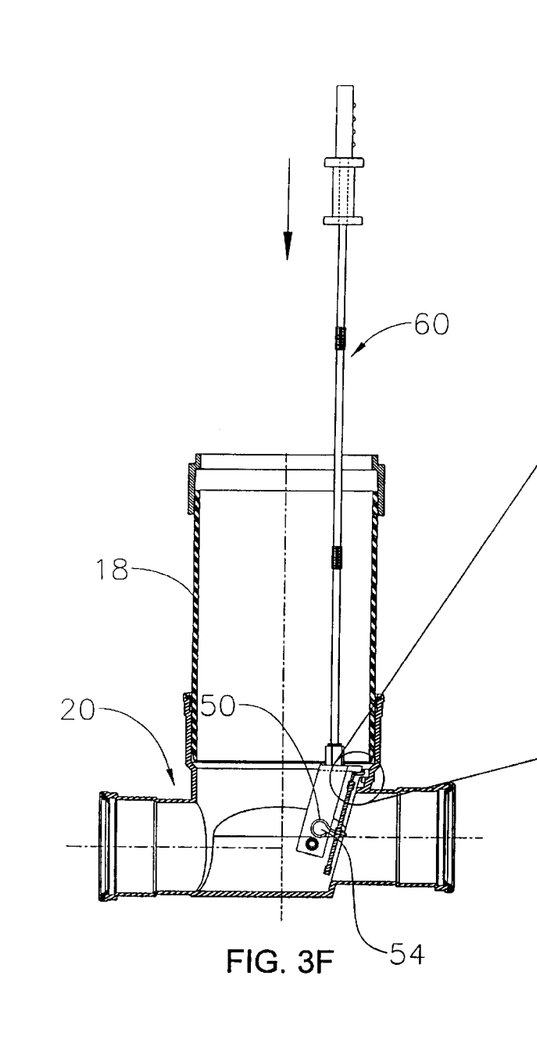
Figure 3G:
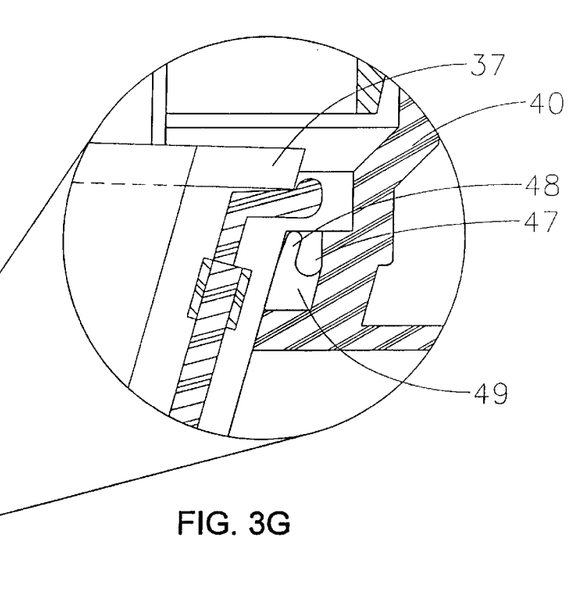

Next, head 62 of tool 60 is lowered through access pipe 18 into inspection chamber 20 and aligned so that the ends of pin 34 extend between fingers 48 above recess 47 with bridge member 37 between fingers 48 as shown in FIGS. 3F and 3G. This is possible because, as noted above, fingers 48 are oriented so that pin 34 can be inserted into recess 47 from the direction of access port 26.

Figure 3H:
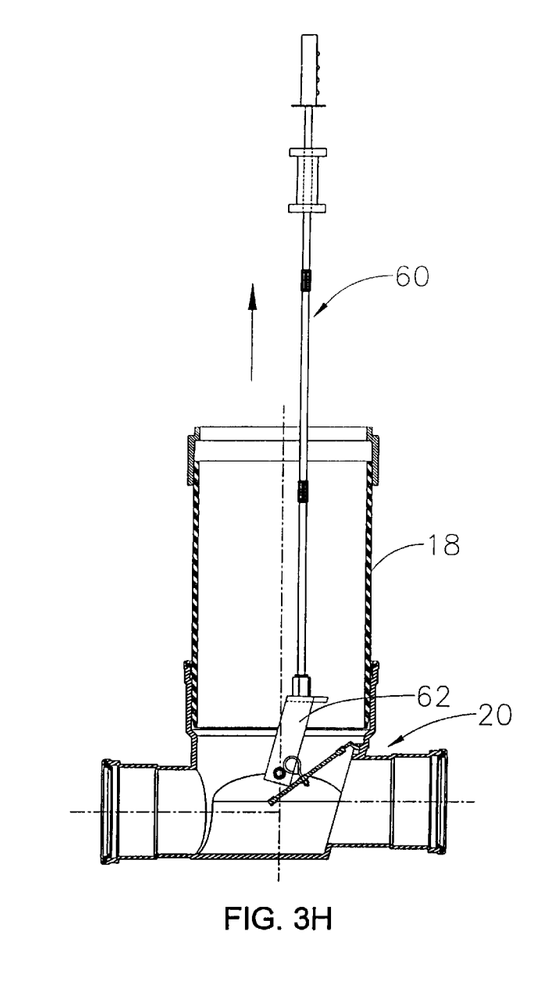

Pin 34 is then inserted into recess 47 by lifting weight 72 and dropping it onto stop 70. This causes portion 80 of head 62 to snap pin 34 downwardly into engagement in clip 44. If it is necessary, the step of lifting and dropping weight 72 to snap pin 34 into place can be repeated. At this point valve member 32 is installed in inspection chamber 20. All that remains is to disengage head 62 of tool 70 from handle member 50. This can easily be done by simply lifting handle 68 to draw fingers 75 and 76 off from handle member 50.

The methods of the invention can also be used to remove a valve member 32 from an inspection chamber 20. This might be required, for example, if it becomes necessary to clean sewer outlet pipe 16. If valve member 32 is intact then valve member 32 can be removed simply by hooking aperture 54 of handle member 50 with a suitable hook and pulling sharply upwardly. Tool 60 is preferably constructed so that head 62 can be removed and replaced with a hook 63 for this purpose. Hook 63 can also be used to remove plugs 21 as described above. When tool 60 is used this way then weight 72 can be hammered upwardly against handle 68 to provide sharp upward force on hook 63 to dislodge a valve member 32 or a plug 21.

Figure 4D:
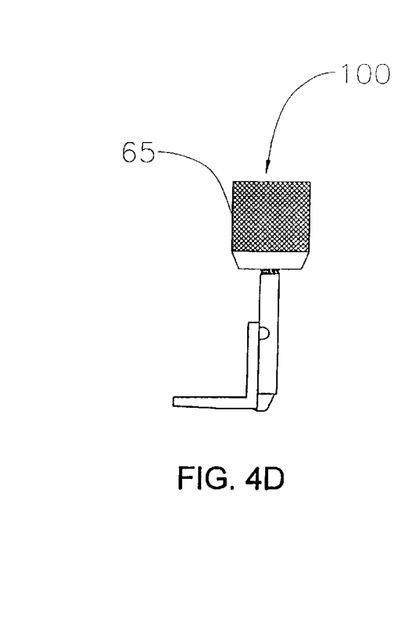

If valve member 32 has broken off then it is still usually possible to replace valve member 32 without digging down to inspection chamber 20. Typically valve member 32 will break at bridge member 37 because bridge member 37 is generally the weakest part of valve member 32. If this happens then a small laterally extending hook 100 can be attached at the end of tool 60 in place of hook 63 or head 62 and inserted into notch 49. The laterally extending hook 100 can then be lifted upwardly to remove pin 34 from clip 44. The portion of a broken off valve member 32 attached to pin 34 is generally small enough that it can safely be left to wash into sewer main 15. The rest of valve member 32 including flap member 36 can be fished out from inspection chamber 20 by hooking handle member 50. The laterally extending hook 100 may be provided in a kit with a hook 63, a head 72 and other components of tool 60.

Figure 5A:
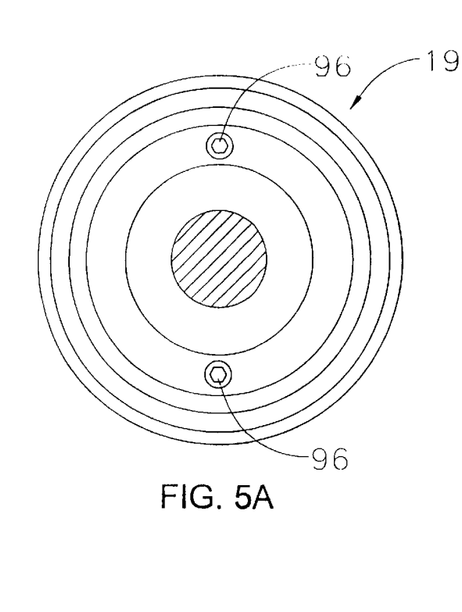
Figure 5B:
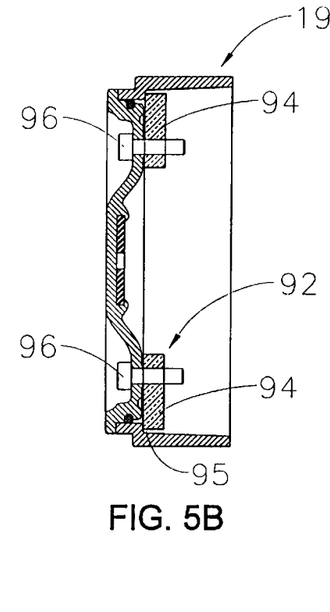
Figure 5C:
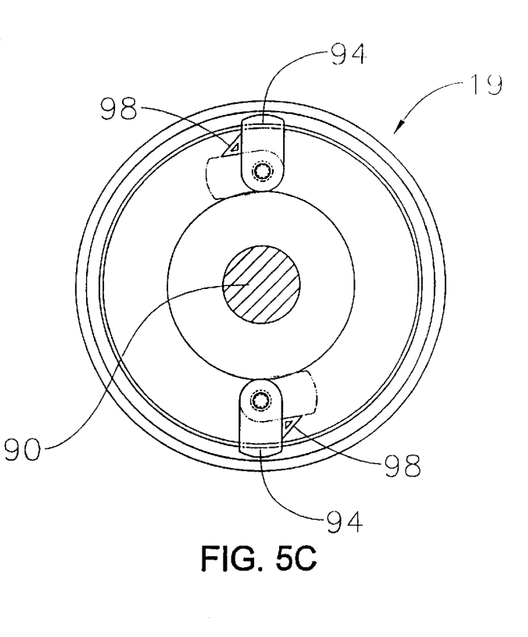

Sealing lid 19 is preferably made of a suitable plastic material. Sealing lid 19 preferably comprises a piece 90 of a ferromagnetic metal, such as iron or steel so that a metal detector can be used to rapidly locate sealing lid 19 and access pipe 18. Most preferably, sealing lid 19 is moulded from a suitable plastic material and piece 90 is moulded into sealing lid 19. For example, if sealing lid 19 is injection moulded then piece 90 can be placed into the mould before plastic is injected. After the plastic has been injected then piece 90 is partially or entirely encased in plastic.

Sealing lid 19 preferably comprises one or more locking members 92 for locking sealing lid 19 in place at the top of access pipe 18. Locking members 92 may comprise, for example, lugs 94 which can be turned to project outwardly and engage an inwardly projecting step 95 at the upper end of access pipe 18 using cap screws 96. Preferably, a post 98 is provided adjacent each of lugs 94. Posts 98 provide positive stops at the extended (as shown in solid lines in FIG. 5C) and retracted (as shown in dotted outline in FIG. 5C) positions of lugs 94.

While the currently preferred embodiment of the invention is described above, it will be clear to those skilled in the art that there are many ways to vary the designs of the various components described above without departing from the broad scope of the invention. For example, clip 44 could be any suitable kind of clip capable of receiving and detachably and pivotally retaining a valve member comprising a flap member 36 and oriented to receive the valve member from the direction of access port 26. While it is preferred, handle member 50 need not comprise a ring, as described. It is only necessary that handle member 50 provide a means for holding a valve member 32 to an tool 60 so that valve member 32 can be positioned in inspection chamber 20 and engaged with clip 44. It is preferable, however, that handle member 50 comprises a ring because a ring can be grabbed with a hook to remove a valve member 32. Tool 60 need not be equipped with a sliding weight 72. Although it is not preferred, a separate hammer could be used to hammer on an end portion of tool 60 instead.

As will be apparent to those skilled in the art in the light of the foregoing disclosure, many further alterations and modifications are possible in the practice of this invention without departing from the spirit or scope thereof. Accordingly, the scope of the invention is to be construed in accordance with the substance defined by the following claims.

What is claimed is:

1. A tool for installing a flap valve valve member in an inspection chamber in a sanitary sewer system, the tool comprising:

(a) an elongated shaft extending from to a handle to a holder, the holder comprising:
      (i) first and second generally parallel opposed fingers spaced apart by a distance sufficient to receive a handle member projecting from a flap valve member;
      (ii) bias means for resiliently displacing the first finger toward the second finger for releasably pinching a handle member projecting from a flap valve member between the first and second fingers;
      (iii) a tab projecting from the holder generally perpendicularly to the shaft at a base of the fingers;
   (b) a stop on the shaft between the handle and the holder; and,
   (c) a weight slidably mounted to the shaft between the handle and the stop.

2. The tool of claim 1 wherein the bias means comprises a member extending from the first finger through a hole in the second finger to a head and a compression spring on the member and bearing against the second finger.

3. The tool of claim 2 wherein the elongated shaft comprises a plurality of sections affixed together.

* * * * *